March 23, 1965   J. B. DUNN ETAL   3,174,165
METHOD OF FILTERING AND CONDITIONING SOLVENT
Filed May 14, 1963   3 Sheets-Sheet 1

INVENTORS
Joseph B. Dunn
Marvin O. Ross
BY Frederick M. Ritchie
Their Attorney

March 23, 1965     J. B. DUNN ETAL     3,174,165
METHOD OF FILTERING AND CONDITIONING SOLVENT
Filed May 14, 1963     3 Sheets-Sheet 2

INVENTORS
Joseph B. Dunn
Marvin O. Ross
BY
Frederick M. Ritchie
Their Attorney

March 23, 1965 J. B. DUNN ETAL 3,174,165
METHOD OF FILTERING AND CONDITIONING SOLVENT
Filed May 14, 1963 3 Sheets-Sheet 3

INVENTORS
Joseph B. Dunn
Marvin O. Ross
BY Frederick M. Ritchie
Their Attorney

United States Patent Office 3,174,165
Patented Mar. 23, 1965

3,174,165
METHOD OF FILTERING AND CONDITIONING SOLVENT
Joseph B. Dunn, Vandalia, and Marvin O. Ross, Dayton, Ohio, assignors to General Motors Corporation, Detroit, Mich., a corporation of Delaware
Filed May 14, 1963, Ser. No. 280,349
4 Claims. (Cl. 8—158)

This invention relates to an improved method of filtering and conditioning solvent.

Recently, self-service dry cleaning systems have become popular and have placed the advantages of dry cleaning within the economic reach of everyone. One such dry cleaning system utilizes a replaceable filter cartridge in its solvent circulation system, said cartridge being periodically replaceable in order to maintain the solvent in the best condition. This filter cartridge combines a folded paper element in combination with granular carbon in a cylindrical perforated canister and is designed to provide filtration for approximately 100 dry cleaning cycles before it needs replacing. Toward the end of the cartridge life, the carbon phase of the cartridge becomes less effective and the circulating solvent tends to darken as more of the dyes bled from fabric during the cleaning thereof are retained in the solvent. The use of such dye-tainted solvent causes light fabric to yellow due to a redepositing onto the fabric of dye components in the solvent. This invention is directed to a method of conditioning solvent in a dry cleaner of the type using a replaceable filter cartridge, said method insuring a complete adsorption of dye from the solvent.

Accordingly, it is an object of this invention to provide for a dry cleaner having a circulating solvent system including a replaceable cartridge, a method of conditioning the solvent comprising the step of simultaneously filtering and adsorbing contaminants from the solvent during the operation of the dry cleaner for dry cleaning followed by the step of conditioning the solvent by adsorbing only during a period when the dry cleaner is not being operated for dry cleaning.

A further object of this invention is the provision in a replaceable cartridge type dry cleaning system of a method of conditioning and reclaiming solvent comprising the steps of, using a filtering and adsorbing cartridge to condition the solvent during a first predetermined period, replacing the filtering and adsorbing cartridge with an adsorbing cartridge after said first predetermined period for use in conditioning the solvent during a second predetermined period, and storing said replaced filtering and adsorbing cartridge during said second predetermined period for use after said second predetermined period in a manner whereby the solvent retained therein is returned to said system.

Further objects and advantages of the present invention will be apparent from the following description, reference being had to the accompanying drawings wherein a preferred embodiment of the present invention is clearly shown.

Figure 6:
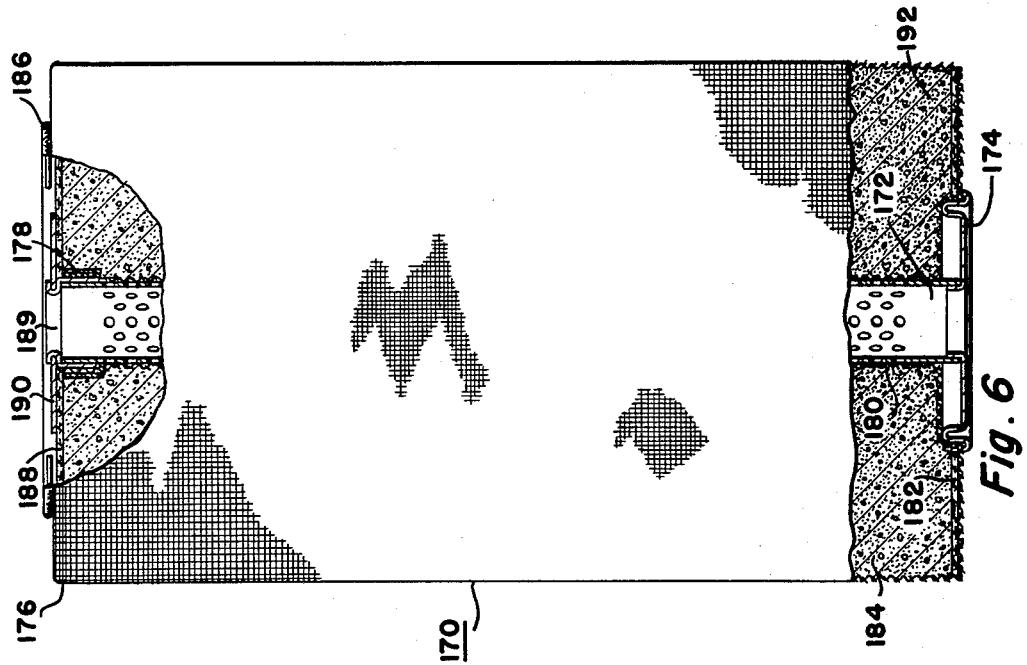
Figure 5:
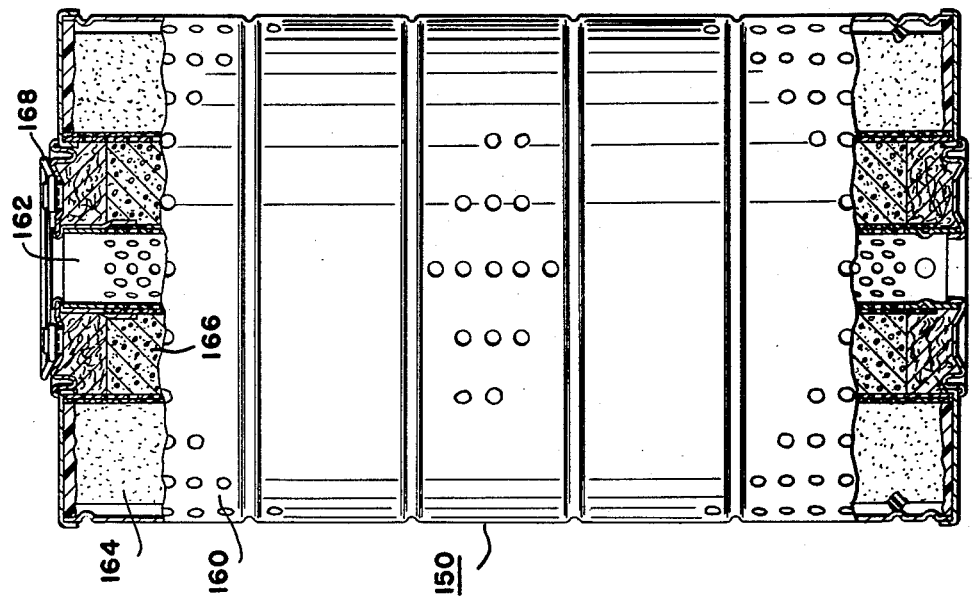

FIGURE 5 is an elevational view, partly in section, of a replaceable filtering and adsorbing cartridge suitable for use with the dry cleaning apparatus described herein in one step of the method of this invention; and FIGURE 6 is an elevational view, partly in section, of an adsorbing cartridge adapted for interchangeable use with said filtering and adsorbing cartridge in another step of the method of this invention.

Figure 1:
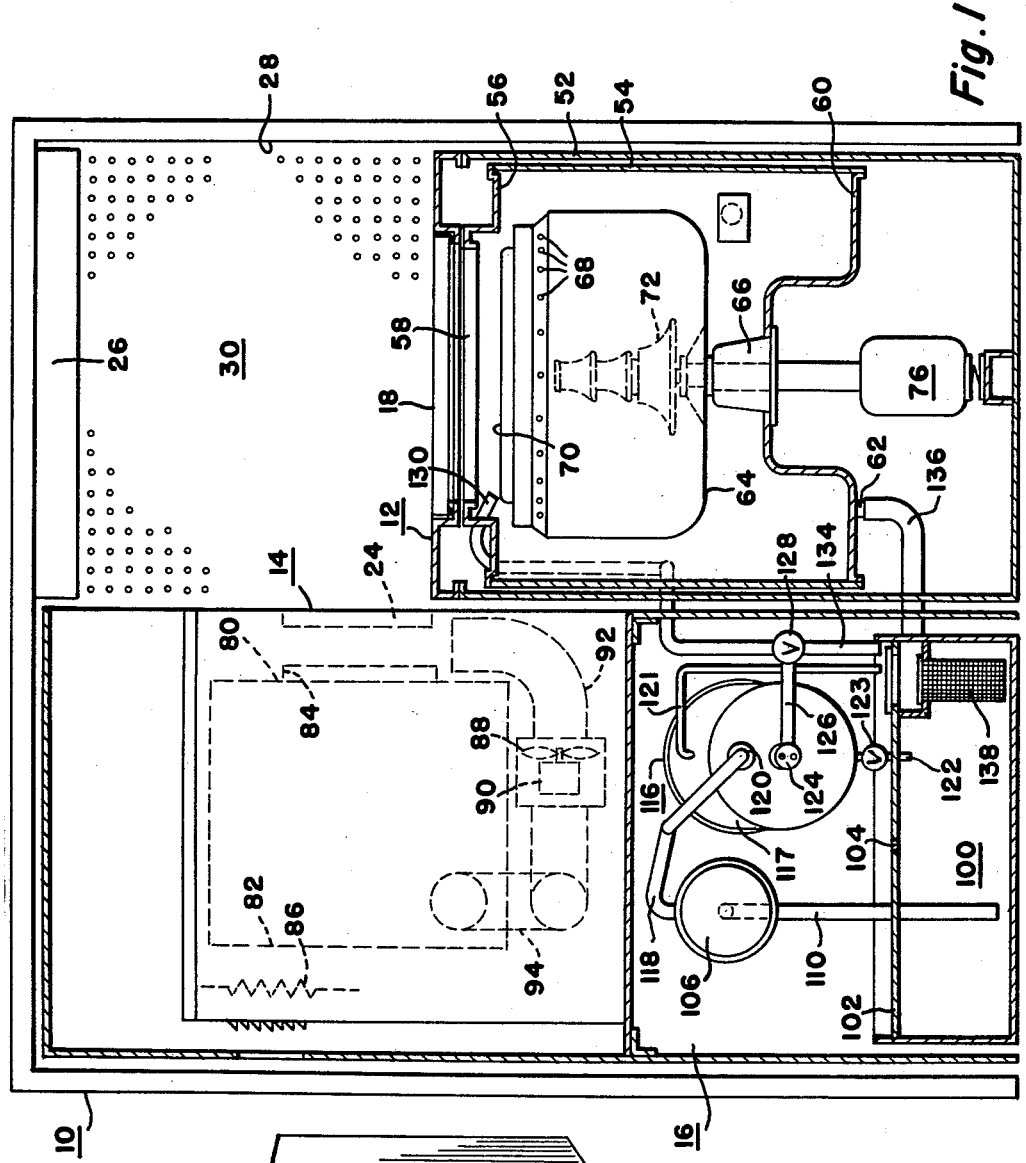
FIGURE 1 is a front sectional view, partly in elevation, of apparatus comprising a unitary dry cleaning system for which the method of this invention is adapted.
Figure 2:
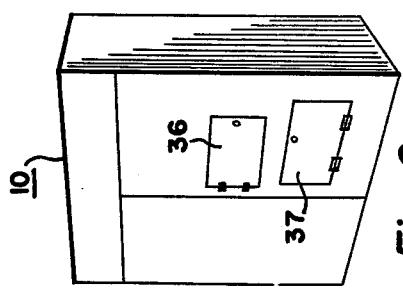
FIGURE 2 is a rear perspective view of the dry cleaning apparatus shown in FIGURE 1.

In accordance with this invention and with reference to FIGURES 1 and 2, a unitary dry cleaning system or apparatus of the replaceable filter cartridge type is illustrated. The system includes an outer cabinet 10 for partially enclosing a clothes cleaner or agitating apparatus 12 and a clothes dryer or drying apparatus 14. Note that the clothes dryer 14 is elevated above the floor to provide for a filter compartment 16 therebelow. The clothes cleaner 12 has a top access door 18 which is pivotally openable for inserting and removing fabrics from the cleaner.

The clothes dryer 14 has a front access door 24 which faces the washer access door 18 adjacent one side thereof. This arrangement places the access doors 18 and 24 in a confined area defined by a top wall 26 and a side wall 28 of the dry cleaning cabinet 10—a perforate grille 30 at the rear of the confined space operating to withdraw fumes from the area. The outlet or vent grille 30 is connected to the atmosphere through an exhaust blower arrangement 29 (FIGURE 3) at the rear of the cabinet.

Turning now to FIGURE 1, the cleaner or agitating apparatus 12 is shown comprised of an outer cabinet 52 in the top wall of which is located the access door 18, hinged along a rear edge thereof. Within the washer cabinet 52, a generally cylindrical, imperforate solvent container 54 is disposed which includes a sub-top portion 56 having an access opening 58 in axial alignment with the top access lid 18 of the washer. A bulkhead 60 closes the lower end of the solvent container 54 and includes a drain opening 62 in a lowermost portion thereof. A generally cylindrical spin tub 64 is rotatably supported by a resilient inverted cup-like member 66 on the bulkhead 60 and includes a plurality of circumferentially arranged outflow ports 68 around an upper portion thereof. The tub 64 has a top access opening 70 which aligns with the opening 58 and the opening closable by the door 18 immediately above. Within the spin tub 64, an agitator 72 is adapted for vertical reciprocation. A motor-driven agitating and spinning mechanism is shown generally at 76 and is adapted to vertically reciprocate the agitator 56 when operated in one manner and to rotate or spin the tub 64 when rotated in another manner.

The clothes dryer 14 is a conventional, single pass, circulating air dryer substantially like that taught in the patent to Whyte 2,843,945 issued July 22, 1958. The dryer includes a horizontally rotatable tumbling drum 80 having a perforate rear wall 82 and a front access opening 84 in alignment with the dryer door 24. A drying heater 86 is disposed adjacent the perforate rear wall 82 of the tumbling drum and adapted to be energized for drying clothes within the tumbling drum. During operation of the heater 86 and rotation of the tumbling drum 80, air is circulated by a fan 88, driven by a motor 90 which may also be connected through a conventional pulley system for rotating the tumbling drum 80. The fan 88 is connected with the drum access opening 84 by way of a front duct 92, said front duct being exhausted by the fan through an exhaust duct 94 connected to a drying cabinet 34 along one side of the dryer at the rear of the dry cleaner. The construction of the cabinet 34 and its function will be described hereinafter in connection with the improved method of this invention.

The solvent circulating system for a dry cleaning fluid or solvent, such as perchlorethylene (a somewhat toxic dry cleaning fluid) or Valclene (a nontoxic dry cleaning fluid made by the DuPont Corporation which is essentially Freon 113) will now be described with reference to FIGURES 1, 3 and 4. The main components of the circulating system include a sump or solvent reservoir 100 having a top wall 102 with an air vent and spill-over return 104. Above the sump top wall 102 is a pump 106 which has its inlet 108 connected through a solvent suction dip tube 110 to the bottom of the sump 100. A filter 116 is adapted to receive the output of the pump through a conduit 118 which connects to the inlet 120 of the filter case 117, said case serving as a receptacle for either a filtering and adsorbing cartridge 150 (FIGURE 5) or an absorbing only cartridge 170 (FIGURE 6). The filter case 117 is positioned angularly in the filter compartment 16, such that a gravity drain 122 extends through the sump wall 102 and includes a valve 123 openable to substantially drain the filter of solvent when the dry cleaning system is shut down. A solvent by-pass line 121 is provided at the top front of the filter case to bleed air from the case. Unfiltered solvent passes through the by-pass line during operation of the filtration system and returns to the solvent reservoir.

At one end of the filter, an outlet fitting 124 connects by way of a conduit 126 through a two-way valve 128 to the tub access opening 70—a terminal portion 130 overlying the top of the spin tub 64. The two-way valve 128 may be controlled such as by a solenoid into a first postion connecting the filter outlet 124 to the spin tub 64 and a second position connecting the filter outlet to a sump return line 134. Completing the circulating system is a conduit 136 which connects to the drain outlet 62 of the solvent container 54. This conduit 136 enters the sump 100 by way of a button trap 138, access to which is gained through a removable lid for cleaning.

The fluid circulation system operates as follows. The pump 106 draws dry cleaning fluid or solvent from sump 100 through the dip tube 110. This dry cleaning fluid, cleaned of large objects by the trap 138, is forced through the conduit 118 to the filter 116 which, with cartridge 150, is effective to remove small solids, solubles and any loose carbon particles from the dry cleaning fluid. After an initial period in which the two-way valve 128 returns the solvent to the sump, the valve is actuated to discharge the solvent from the filter by way of the conduit 126 and its end nozzle 130 into the spin tub 64. When the level of dry cleaning fluid within the tub reaches the outflow ports 68, the dry cleaning fluid will overflow into the solvent container 54 and will return by gravity through the conduit 136 to the sump 100.

Figure 4:
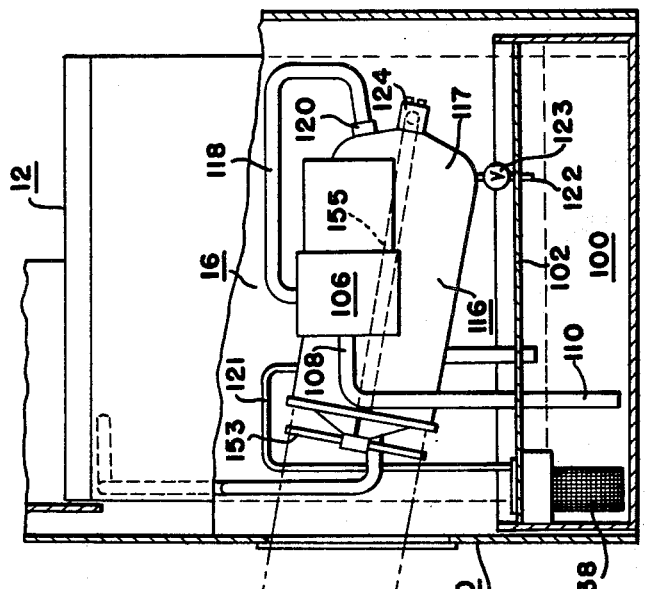
FIGURE 4 is a fragmentary side sectional view, partly in elevation, of the elements shown in FIGURE 3.
Figure 3:
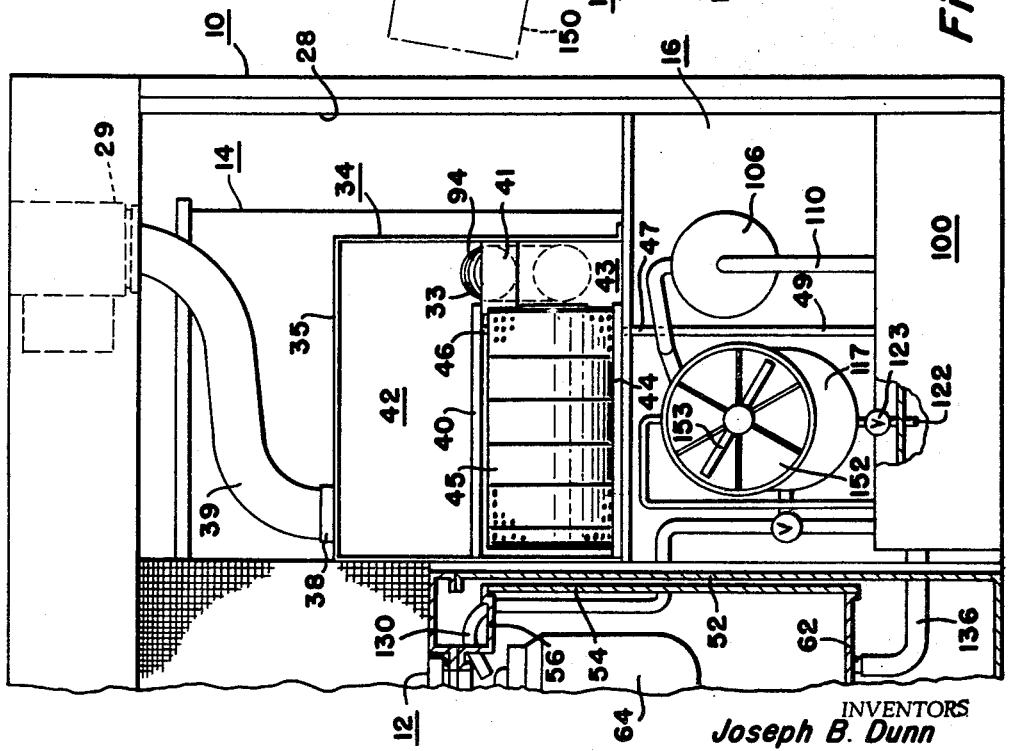
FIGURE 3 is a fragmentary rear sectional view, partly in elevation, with the rear panels of the apparatus removed to expose interior elements thereof.

For the purposes of this invention and with reference to FIGURES 3 and 4, the arrangement of the filter 116 includes a filter casing 117 adapted to contain a removable throw-away filter cartridge or element 150 (FIGURE 5) shown generally in phantom line in FIGURE 4 to indicate that it is removable from the casing 117. This replaceable cartridge 150 is retained in the filter casing by the removable door or cover 152 which is retained to the casing by a latch actuated through an adjustable handle 153. An additional wing nut (not shown) may be used inside the casing to hold the filter cartridge on a perforated outlet tube 155 integral with the outlet from the casing. This places the cartridge in sealed solvent flow intercepting relationship between the inlet 120 and the outlet 124 of the filter casing.

The successful operation of the foregoing dry cleaning apparatus depends on the efficiency with which solvent is handled and conditioned in the system. In this apparatus, a filtering and adsorbing cartridge 150 is utilized which is replaceable after a period of usage. With a filtering and adsorbing cartridge of the type seen in FIGURE 5, solvent will tend to discolor after a period of time even though the particulate contaminants are still being effectively removed by the cartridge. It frequently occurs that the dye removing or adsorbing capability of the cartridge is exhausted before the filtering capability thereof. Thus dyes tend to build up in the solvent until the solvent color changes to a dark amber. When this happens, some of the dyes will redeposit on the fabrics being cleaned and cause a yellowing effect which is particularly noticeable on light colored fabrics. To overcome this dye build-up in the solvent, an adsorbing cartridge 170 (FIGURE 6) is used interchangeably with the filtering and adsorbing cartridge 150.

These two types of removable cartridges are designed for use in the filter case 117. The filtering and adsorbing cartridge 150, shown in FIGURE 5, is comprised of a perforated outer metallic shell 160 and a perforated outlet tube 162. The cartridge 150 includes a first filtering stage of folded paper 164 and a second filtering stage 166 of granular carbon or other suitable material for removing dyes or the like. The cartridge 150 may include a handle 168 for handling the cartridge while inserting or removing it from the filter casing 117. Approximately two pounds of granular carbon are used in the cartridge 150 for conditioning the solvent by adsorbing dyes or the like. For additional details on the construction of the replaceable filtering and adsorbing cartridge, reference may be had to the copending application Serial No. 210,651 filed July 18, 1962, and assigned to the same assignee as this application.

The adsorbing cartridge 170 is constructed with a perforated metallic center outlet tube 172 attached as by welding to a paint can lid 174 to form a subassembly equivalent to its counter-part in the filtering and absorbing cartridge 150. A perforated or woven fabric bag 176 includes an inner return fold portion 180 having its tubular end affixed by a wrapping of tape 178 at one end of the perforated outlet tube 172. The inner portion 180 of the bag hugs the radially outer side of the center tube 172 to form a protective shield which prevents carbon migration into the outlet tube 172. An annular fiberboard or cardboard washer 182 supports the outer wall 184 of the bag in a manner to space it from the inner wall 180, thereby forming a cavity therebetween—the paint can lid 174 press fitting into the washer 182 to retain the fabric and to hold the bottom of the adsorbing cartridge in proper shape. The upper end of the bag outer wall 184 has a draw string 186 which, after the cavity is filled with approximately eight pounds of granular carbon 192, is drawn tightly around an annular fiberboard or cardboard washer 188 at the top of the cartridge. The washer 188 rests on a shoulder of a metal ferrule 189 affixed to the top of the perforated tube 172. When the end of the ferrule is spun over a metal washer 190, the container assembly of the adsorbing cartridge is completed. So that the outer surface of the cartridge 170 remains cylindrical, the bag, paint can lid and center tube subassembly may be placed in a cylindrical fixture while the cavity is being filled with carbon.

In accordance with the teachings of this invention, the method of conditioning dry cleaning solvent is as follows. While the dry cleaner 12 is being used to clean fabric and solvent is being circulated by the pump 106, a filter cartridge, such as 150, is positioned within the filter casing 117 to intercept the solvent flow between the sump 100 and the cleaner tub 64. The filter 150 will remove particulate matter from the solvent with the paper portion 164 and will adsorb soluble contaminants with the charcoal or granular carbon 166. A cartridge 150 will normally be effective for approximately 100 dry cleaning cycles. However, throughout the usage of the cartridge 150, the solvent will tend to decolorize and to turn an increasingly darker shade of amber. Therefore, in accordance with this invention, the solvent is treated periodically, for instance during a period when the dry cleaning operation is shut down for the night, by removing the filtering and adsorbing cartridge 150 from the filter casing 117 and replacing it for the night with the absorbing cartridge 170. In the morning the filtering and adsorbing cartridge is returned to the solvent circulating system and the adsorbing cartridge disposed of.

Occasionally, after approximately 100 cycles, the filtering and adsorbing cartridge 150 must be disposed of. When the cartridge 150 is ready for disposal, there is still considerable solvent retained in the pores of the cartridge and this solvent may be reclaimed using the waste heat in the exhaust from the dryer 14. To accomplish this solvent reclamation and with reference to FIGURE 3, a cartridge drying cabinet 34 is positioned to the rear of the dryer 14 and adapted to receive the hot drying air being exhausted through duct 94 from the dryer. The drying cabinet 34 is comprised of a box-like sheet metal housing 35 closable by a door 36 (FIGURE 2). The housing has an inlet 33 connected to the dryer exhaust duct and an outlet 38 connected by way of a flexible conduit 39 to a portion of the inlet to the main system exhaust blower 29. The housing is divided by a dished-out shelf or pan 40 and a sloped baffle 41 to form a drying compartment 42 and a drainage or storage compartment 43, the latter compartment having a dished-out shelf or pan 44 adapted to receive any filtering and adsorbing cartridge, such as 150, during temporary storage thereof. Gravity drain conduits 46, 47 attach to the shelves 40, 44, respectively, and are joined into a return conduit 49 which reurns liquid solvent droppings to the solvent circulating system.

More particularly, these steps may be followed for interchangeably using cartridges 150 and 170 and for reclaiming solvent from the used cartridges.

First, the solvent circulating system will be switched out of service by disconnecting the pump 106. The controls are available through an access door 37 on the back panel of the dry cleaning apparatus 10 (FIGURE 2).

Secondly, open the filter drain valve 123 for a period sufficiently long to allow the solvent to drain from the filter casing 117, for instance, approximately one minute.

Next, open the storage compartment door 36 to expose the filter cartridge storing and drying compartment 34.

Then remove the filter casing cover 152 by unloosening the latch handle 153. After the access cover 152 has been removed, any suitable cartridge retaining means, such as a wing nut threadedly engageable with the filter casing center support tube 155 (FIGURE 4), may be released so that the filtering and adsorbing cartridge 150 can be removed. Place the removed cartridge 150 on the shelf 44 of the overnight storage compartment 43. This will permit solvent trapped in the pores of the cartridge 150 to return through a conduit 49 to the sump 100.

Next, insert an adsorbing cartridge 170 into the filter casing 117 and latch in position in the same manner used to retain the cartridge 150. Close the valve 123 and condition the solvent circulating system for by-pass operation whereby the pump 106 will circulate solvent from the sump 100 through the filter casing and the adsorbing cartridge to the conduits 126 and 134—the valve 128 being operated in a manner to set up a solvent by-pass circuit during the period that the adsorbing cartridge 170 is in the solvent circulating system.

After a night of solvent recirculation, the operator may reverse the above steps by removing the adsorbing cartridge 170 and replacing it with the filtering and adsorbing cartridge 150. Then, the dry cleaning apparatus 10 is ready for use in another period of dry cleaning wherein the solvent is pumped through the cartridge 150 to the spin tub 64.

After the useful life of the filtering and adsorbing cartridge 150 is expended, the cartridge, upon removal from the filter casing 117, may be positioned in the drying compartment 42 as taught hereinbefore to dry out the cartridge; and then the cartridge may be disposed of.

When the adsorbing cartridge 170 is removed from the filter casing 117, it may be disposed of.

It should now be seen that an improved method has been devised for conditioning solvent in a dry cleaning system using replaceable cartridge elements. Additional dye adsorption is accomplished by this method without requiring a filtering and adsorbing cartridge design which would be unwieldly and unadaptable to a dry cleaning system of the replaceable cartridge type.

While the embodiment of the present invention as herein disclosed constitutes a preferred form, it is to be understood that other forms might be adopted.

What is claimed is as follows:

1. For use with a dry cleaner having a recirculating solvent system including a dry cleaning circuit having a receptacle for dry cleaning fabric and a by-pass circuit for by-passing said receptacle, a cartridge casing in solvent circulation intercepting relationship to both of said circuits and adapted to receive a removable cartridge, and a storage compartment in gravity drain relationship with said system and adapted to receive a removed cartridge, the method of conditioning circulating solvent comprising the steps of, positioning a filtering and adsorbing cartridge in said casing during a first circulation of said solvent in said dry cleaning circuit for removing particulate matter and adsorbing dyes or the like, removing said filtering and adsorbing cartridge from said casing, placing the removed filtering and adsorbing cartridge in said storage compartment whereby the solvent retained in said filtering and adsorbing cartridge at the time of its removal is returned to said system, positioning an adsorbing only cartridge into said casing during the circulation of said solvent in said by-pass circuit for adsorbing dyes or the like while said filtering and adsorbing cartridge is in said storage compartment, and replacing said adsorbing only cartridge with said filtering and adsorbing cartridge to again position the filtering and adsorbing cartridge in said casing during a second circulation of said solvent in said dry cleaning circuit.

2. For use with a dryer having a circulating air system and a dry cleaner having a circulating solvent system including a dry cleaner circuit having a receptacle for dry cleaning fabric and a by-pass circuit for by-passing said receptacle, a cartridge casing in solvent circulation intercepting relationship to both of said circuits and adapted to receive a removable cartridge, and a storage compartment in gravity drain relationship with said solvent system and in circulating air receiving relationship to said air system and adapted to receive a removed cartridge, the method of conditioning and reclaiming solvent comprising the steps of, inserting a filtering and adsorbing cartridge in said casing before the circulation of said solvent in said dry cleaning circuit for removing particulate matter and adsorbing dyes or the like, circulating solvent in said dry cleaning circuit, terminating the circulation of solvent in said dry cleaning circuit, circulating air in said dryer air system, removing said filtering and adsorbing cartridge from said casing, placing the removed filtering and adsorbing cartridge in said storage compartment whereby a first portion of the solvent retained in said filtering and adsorbing cartridge at the time of its removal is returned to said solvent system and a second portion of the solvent retained in said filtering and adsorbing cartridge is vaporized by said circulating air, inserting an adsorbing cartridge into said casing before the circulation of said solvent in said by-pass circuit for adsorbing dyes or the like while said filtering and adsorbing cartridge is in said storage compartment, circulating solvent in said by-pass circuit, terminating the circulation of solvent in said by-pass circuit, and replacing said adsorbing cartridge with said filtering and adsorbing cartridge before the solvent is again circulated in said dry cleaning circuit.

3. For use wtih a dry cleaner having a recirculating solvent system including a dry cleaning circuit having a receptacle for dry cleaning fabric and a by-pass circuit for by-passing said receptacle, a cartridge casing in solvent circulation intercepting relationship to both of said circuits and adapted to receive a removable cartridge, and a storage compartment in solvent return relationship with said system and adapted to receive a removed cartridge, the method of conditioning circulating solvent comprising the steps of, positioning a filtering and adsorbing cartridge in said casing during a first circulation of said solvent in said dry cleaning circuit for removing particulate matter and adsorbing dyes or the like, removing said filtering and adsorbing cartridge from said casing, placing the removed filtering and adsorbing cartridge in said storage compartment whereby the solvent retained in said filtering and adsorbing cartridge at the time of its removal is returned to said system, positioning an adsorbing only cartridge into said casing during the circulation of said solvent in said by-pass circuit for adsorbing dyes or the like while said filtering and adsorbing cartridge is in said storage compartment, and replacing said adsorbing only cartridge with said filtering and adsorbing cartridge to again position the filtering and adsorbing cartridge in said casing during a second circulation of said solvent in said dry cleaning circuit.

4. For use with a dryer having a circulating air system and a dry cleaner having a circulating solvent system including a dry cleaning circuit having a receptacle for dry cleaning fabric and a by-pass circuit for by-passing said receptacle, a cartridge casing in solvent circulation intercepting relationship to both of said circuits and adapted to receive a removable cartridge, and a storage compartment in circulating air receiving relationship to said air system and adapted to receive a removed cartridge, the method of conditioning and reclaiming solvent comprising the steps of, inserting a filtering and adsorbing cartridge in said casing before the circulation of said solvent in said dry cleaning circuit for removing particulate matter and adsorbing dyes or the like, circulating solvent in said dry cleaning circuit, terminating the circulation of solvent in said dry cleaning circuit, circulating air in said dryer air system, removing said filtering and adsorbing cartridge from said casing, placing the removed filtering and adsorbing cartridge in said storage compartment whereby a portion of the solvent retained in said filtering and adsorbing cartridge at the time of its removal is vaporized by said circulating air, inserting an adsorbing cartridge into said casing before the circulation of said solvent in said by-pass circuit for adsorbing dyes or the like while said filtering and adsorbing cartridge is in said storage compartment, circulating solvent in said by-pass circuit, terminating the circulation of solvent in said by-pass circuit, and replacing said adsorbing cartridge with said filtering and adsorbing cartridge before the solvent is again circulated in said dry cleaning circuit.

References Cited by the Examiner

UNITED STATES PATENTS

| | | | |
|---|---|---|---|
| 1,788,085 | 1/31 | Dorner | 68—18 |
| 1,917,096 | 7/33 | Chamberlin | 68—18 X |
| 2,101,014 | 11/37 | Angelus et al. | 68—18 X |
| 2,554,748 | 5/51 | Lewis et al. | 210—484 |
| 2,768,869 | 10/56 | Creswick | 68—18 X |
| 2,946,449 | 7/60 | Shaw | 210—484 |
| 3,101,239 | 8/63 | Warren et al. | 8—142 |
| 3,101,240 | 8/63 | Mathews | 8—142 |

WALTER A. SCHEEL, *Primary Examiner.*

WILLIAM I. PRICE, *Examiner.*